(12) United States Patent
Prociw et al.

(10) Patent No.: US 8,943,827 B2
(45) Date of Patent: Feb. 3, 2015

(54) FUEL AIR HEAT EXCHANGER

(75) Inventors: Lev Alexander Prociw, Johnston, IA (US); Eduardo Hawie, Woodbridge (CA)

(73) Assignee: Pratt & Whitney Canada Corp., Longueuil, QC (CA)

(*) Notice: Subject to any disclaimer, the term of this patent is extended or adjusted under 35 U.S.C. 154(b) by 887 days.

(21) Appl. No.: 13/118,992

(22) Filed: May 31, 2011

(65) Prior Publication Data

US 2012/0304662 A1 Dec. 6, 2012

(51) Int. Cl.
*F02C 7/12* (2006.01)
*F02C 7/224* (2006.01)
*F01D 25/12* (2006.01)
*F01D 25/14* (2006.01)

(52) U.S. Cl.
CPC ............... *F02C 7/224* (2013.01); *F01D 25/12* (2013.01); *F01D 25/14* (2013.01); *F05D 2230/54* (2013.01); *Y02T 50/675* (2013.01)
USPC ................... 60/736; 60/730; 60/734; 60/782; 60/806

(58) Field of Classification Search
CPC ............. F02C 7/12; F02C 7/185; F02C 7/224
USPC ........... 60/736, 730, 734, 737, 782, 266, 267, 60/728, 805, 806, 748
See application file for complete search history.

(56) References Cited

U.S. PATENT DOCUMENTS

| | | | |
|---|---|---|---|
| 2,757,907 A * | 8/1956 | Williams | 165/9 |
| 4,120,150 A | 10/1978 | Wakeman | |
| 5,317,877 A | 6/1994 | Stuart | |
| 5,414,992 A | 5/1995 | Glickstein | |
| 5,619,855 A | 4/1997 | Burrus | |
| 6,182,435 B1 | 2/2001 | Niggemann et al. | |
| 6,253,554 B1 | 7/2001 | Kobayashi et al. | |
| 6,415,595 B1 | 7/2002 | Wilmot, Jr. et al. | |
| 6,460,326 B2 * | 10/2002 | Bechtel et al. | 60/39.465 |
| 6,578,362 B1 | 6/2003 | Coffinberry | |
| 6,584,778 B1 | 7/2003 | Griffiths et al. | |
| 6,672,072 B1 | 1/2004 | Giffin, III | |
| 6,931,834 B2 | 8/2005 | Jones | |
| 6,993,913 B2 | 2/2006 | Kobayashi et al. | |
| 7,213,391 B2 | 5/2007 | Jones | |
| 7,231,769 B2 | 6/2007 | Spadaccini et al. | |
| 2007/0234724 A1 * | 10/2007 | Prociw et al. | 60/740 |
| 2008/0304958 A1 | 12/2008 | Norris et al. | |

* cited by examiner

*Primary Examiner* — Phutthiwat Wongwian
*Assistant Examiner* — Steven Sutherland
(74) *Attorney, Agent, or Firm* — Norton Rose Fulbright Canada LLP

(57) ABSTRACT

A gas turbine engine with a fuel air heat exchanger located in the high pressure plenum. The heat exchanger includes at least one air conduit and at least one fuel conduit in heat exchange relationship with one another, with a fuel flow communication between a fuel source and fuel distribution members of the combustor being provided at least partly through the at least one fuel conduit, and the at least one air conduit defining a fluid flow communication between the high pressure plenum and an engine component to be cooled by the compressed air.

20 Claims, 9 Drawing Sheets

US 8,943,827 B2

FUEL AIR HEAT EXCHANGER

TECHNICAL FIELD

The application relates generally to a heat exchanger for a gas turbine engine and, more particularly, to such a heat exchanger putting fuel and compressed air in heat exchange relationship with one another.

BACKGROUND OF THE ART

Gas turbine engines typically become more efficient with higher turbine inlet gas temperatures. However higher turbine inlet gas temperatures necessitate increased cooling of the turbine components.

It has been known to provide a heat exchanger located in low pressure areas of the engine or outside of the engine casing, where fuel is put into heat exchange relationship with the pressurized air from the combustor to heat the fuel before combustion and cool the pressurized air surrounding the high pressure turbine. Such heat exchanger typically require a high pressure casing to contain the pressurized air and relatively heavy air ducts to circulate the pressurized air to and from the heat exchanger.

Accordingly, improvements are desirable.

SUMMARY

In one aspect, there is provided a gas turbine engine comprising a compressor section, an annular high pressure plenum in fluid flow communication with a discharge of the compressor section for receiving compressed air, a combustor contained in the high pressure plenum, a turbine section in fluid flow communication with the combustor, and a heat exchanger located in the high pressure plenum, the heat exchanger including at least one air conduit and at least one fuel conduit in heat exchange relationship with one another, with a fuel flow communication between a fuel source and fuel distribution members of the combustor being provided at least partly through the at least one fuel conduit, and the at least one air conduit defining a fluid flow communication between the high pressure plenum and an engine component to be cooled by the compressed air.

In another aspect, there is provided a method of cooling an engine component of a gas turbine engine, the method comprising circulating compressed air from a high pressure plenum in connection with a compressor discharge of the engine to a heat exchanger located in the high pressure plenum, circulating fuel from a fuel source of the engine to the heat exchanger, cooling the circulated compressed air in the heat exchanger through heat exchange with the fuel, circulating the fuel from the heat exchanger to fuel distribution members of a combustor of the engine, and cooling the engine component with the cooled compressed air from the heat exchanger.

In a further aspect, there is provided a fuel air heat exchanger for a gas turbine engine, the heat exchanger comprising an annular duct having at least one fuel conduit and at least one air conduit extending around a circumferential direction thereof and in heat exchange relationship with one another, each fuel conduit having an inlet for communication with a fuel source and an outlet for communication with fuel distribution members of the combustor, each air conduit having an inlet and an outlet, an annular wall element extending from the duct along an approximately axial direction, and a perforated baffle extending from the duct along an approximately axial direction and connected to the wall element spaced apart from the duct, the wall element, baffle and an adjacent portion of at least one wall of the duct together forming a closed cross-section and defining an annular cooling plenum in fluid flow communication with the outlet of each air conduit.

DESCRIPTION OF THE DRAWINGS

Reference is now made to the accompanying figures in which.

DETAILED DESCRIPTION

Figure 1:
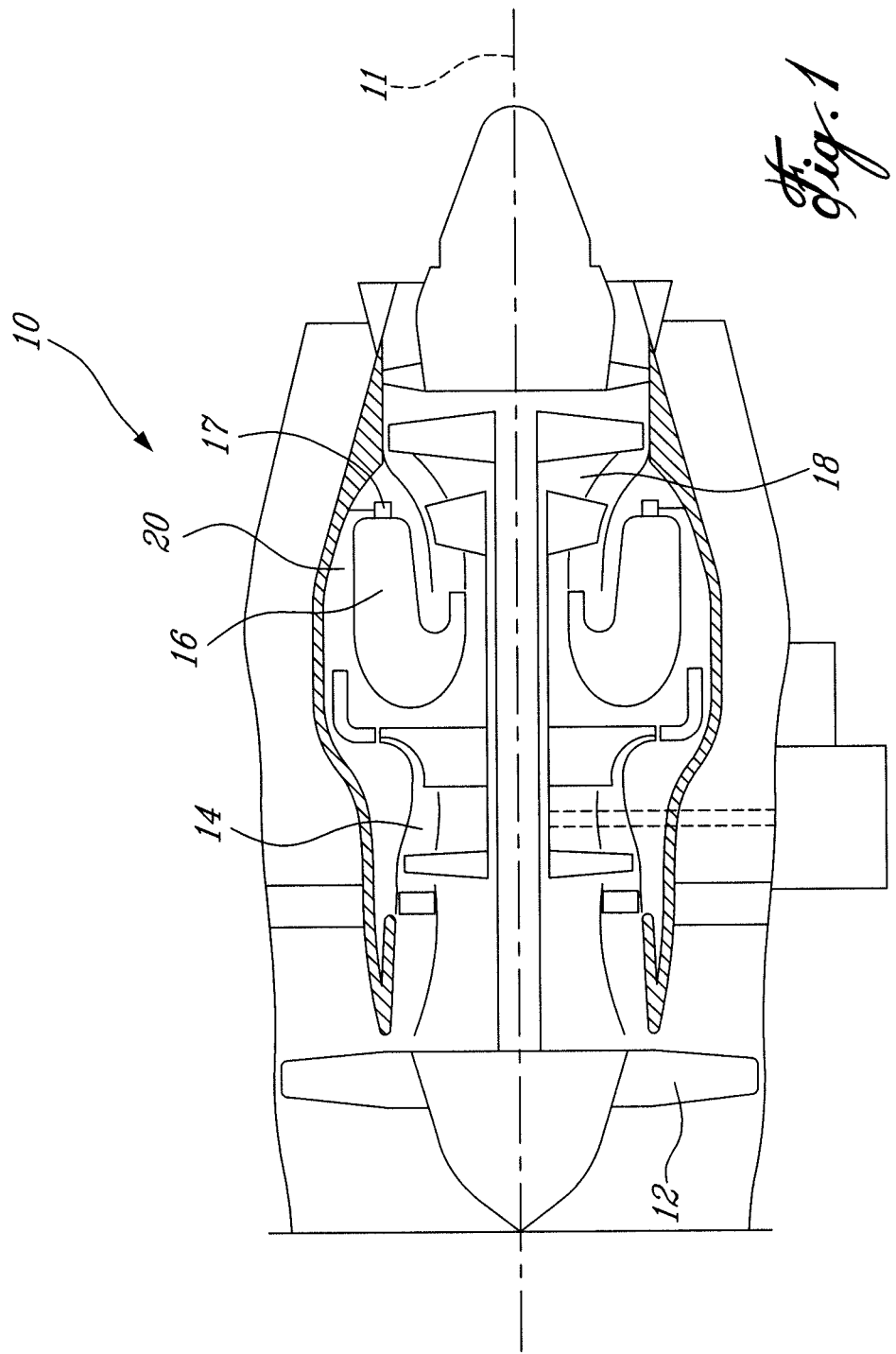
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The gas turbine engine 10 includes an annular high pressure plenum 20 in which the combustor 16 is contained. The high pressure plenum 20 is in fluid flow communication with a discharge of the compressor section 14 for receiving the compressed air. Although the combustor 16 is illustrated as being a reverse flow combustor, alternately the combustor can be a direct flow combustor. The engine 10 may also be an alternate type of gas turbine engine, such as for example a turboprop engine.

Figure 2:
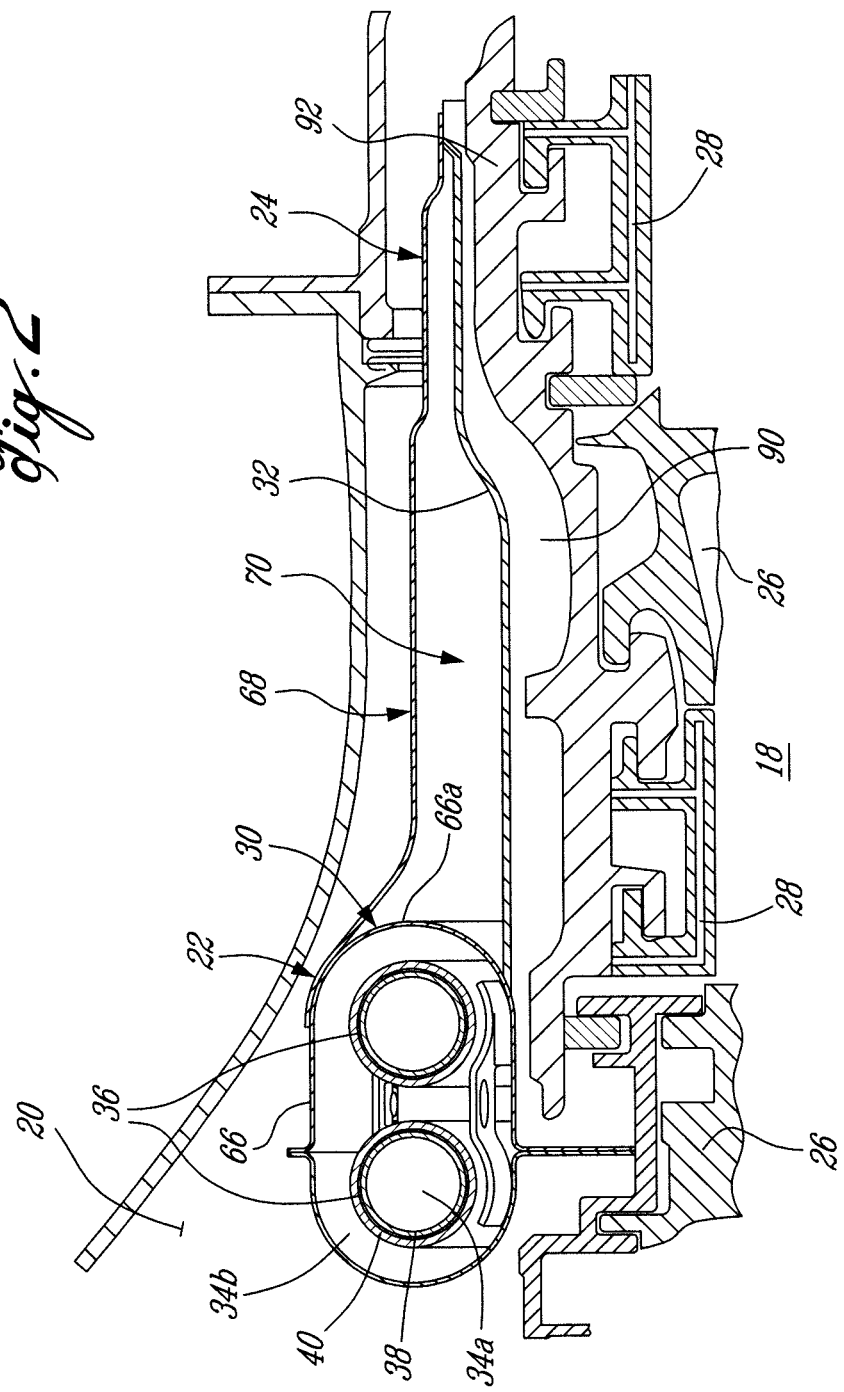
FIG. 2 is a schematic cross-sectional view of a heat exchanger and part of a gas turbine engine such as shown in FIG. 1.

Referring to FIG. 2, a heat exchanger 22 is located in the high pressure plenum 20. In the embodiment shown, the heat exchanger 22 is designed and positioned to cool an upstream portion of the turbine section 18, and in particular a turbine support case 92 surrounding the high pressure turbine vanes 26 and carrying shroud segments 28, such as to control the tip clearance of the turbine stages. It is understood that the heat exchanger configuration shown can alternately be adapted to cool other components of the gas turbine engine, for example oil, different air sources, metal parts, etc.

The heat exchanger 22 includes an annular duct 30 surrounding the engine component to be cooled, here the turbine support case 92. As shown, an annular perforated baffle 32 which surrounds the turbine support case 92 is part of the heat exchanger 22. The duct 30 contains at least one air conduit 34a,b and at least one fuel conduit 36 which extend around the circumferential direction of the duct 30 in heat exchange relationship with one another.

Figure 3:
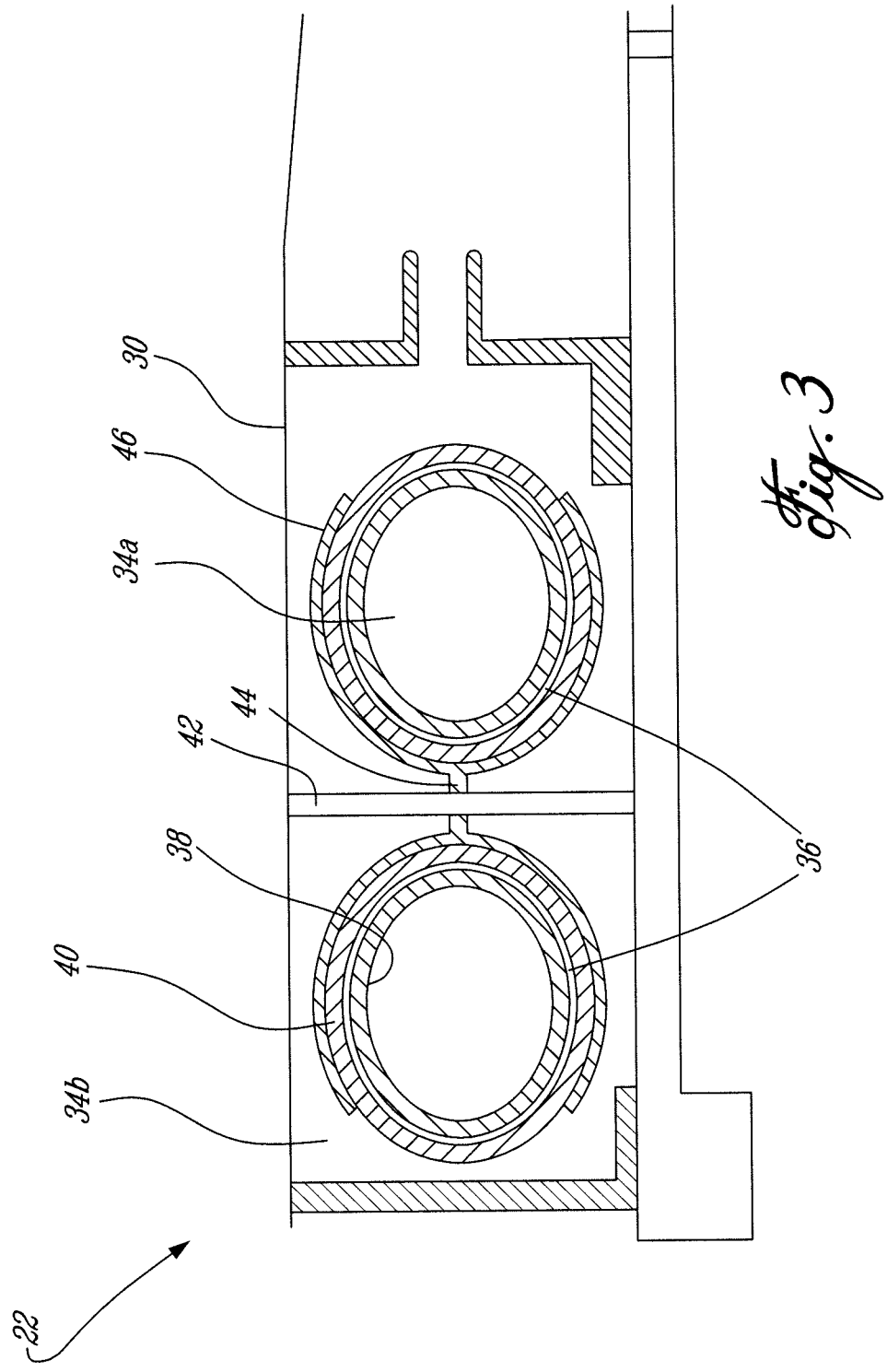
FIG. 3 is a schematic, partial cross-sectional view of the heat exchanger of FIG. 2.

In the embodiment shown in FIGS. 2 and 3, the heat exchanger includes two fuel conduits 36, which are each defined by an annular gap between inner and outer concentric tubes 38, 40 of slightly different diameters. In a particular embodiment, the gap measures between 0.015 inch and 0.05 inch, the gap size being selected based on the fuel flow rate and heat transfer required. In a particular embodiment, the fuel conduits 36 are retained by a radial mount 42 extending across the duct 30, from which extends a pin 44 retaining the fuel conduit 36, for example through a C-shaped member 46, to allow for thermal expansion and contraction of the conduits 36.

In a particular embodiment, the inner tube 38 is inserted in the outer tube 40 while the tubes are straight, and the tubes are then formed into the circular geometry. A spacer, for example a wire or granular filler material, is used between the tubes 38, 40 to maintain the gap during forming. Once the tubes have been deformed, the spacer can be removed.

The fuel conduits 36 of the heat exchanger 22 provide a fuel flow communication between a fuel source (not shown) and fuel distribution members 17 (see FIG. 1) of the combustor 16; in a particular embodiment, all of the fuel flow from the fuel source to the combustor 16 circulates through the heat exchanger 22. The quantity of fuel that is required to go through the heat exchanger 22 depends on the architecture of the fuel system and on the cooling requirements of the particular component being cooled; as such, in an alternate embodiment, only the primary flow or only the secondary flow are circulated through the heat exchanger 22.

Figure 4:
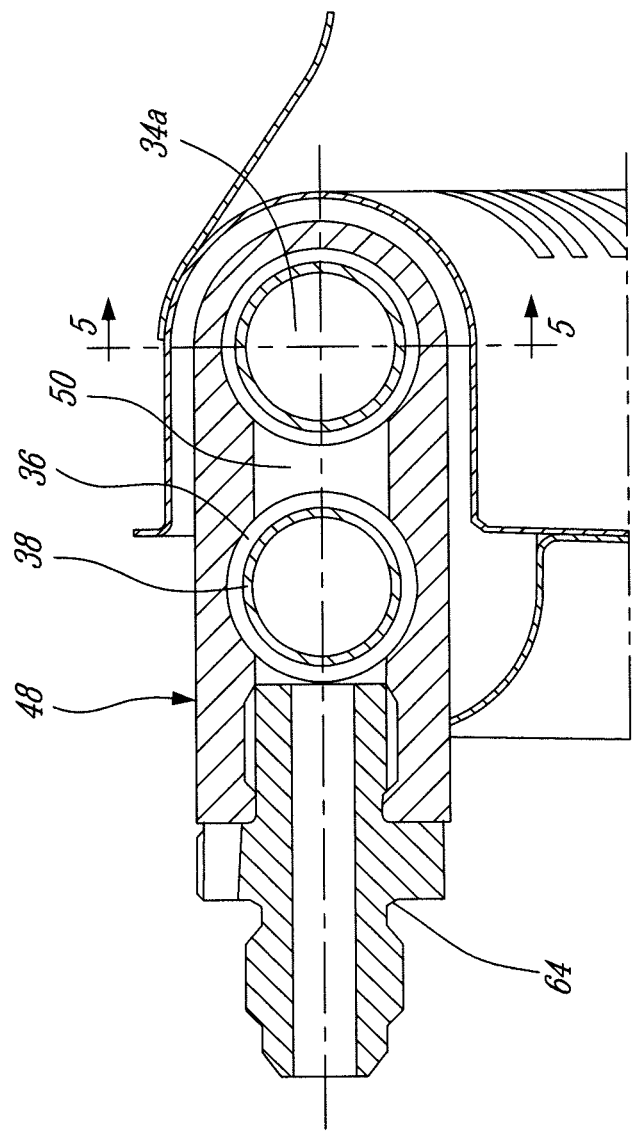
FIG. 4 is a schematic cross-sectional view of a fitting defining a fuel inlet and outlet of the heat exchanger of FIG. 2, taken along line 4-4 in FIG. 5.
Figure 5:
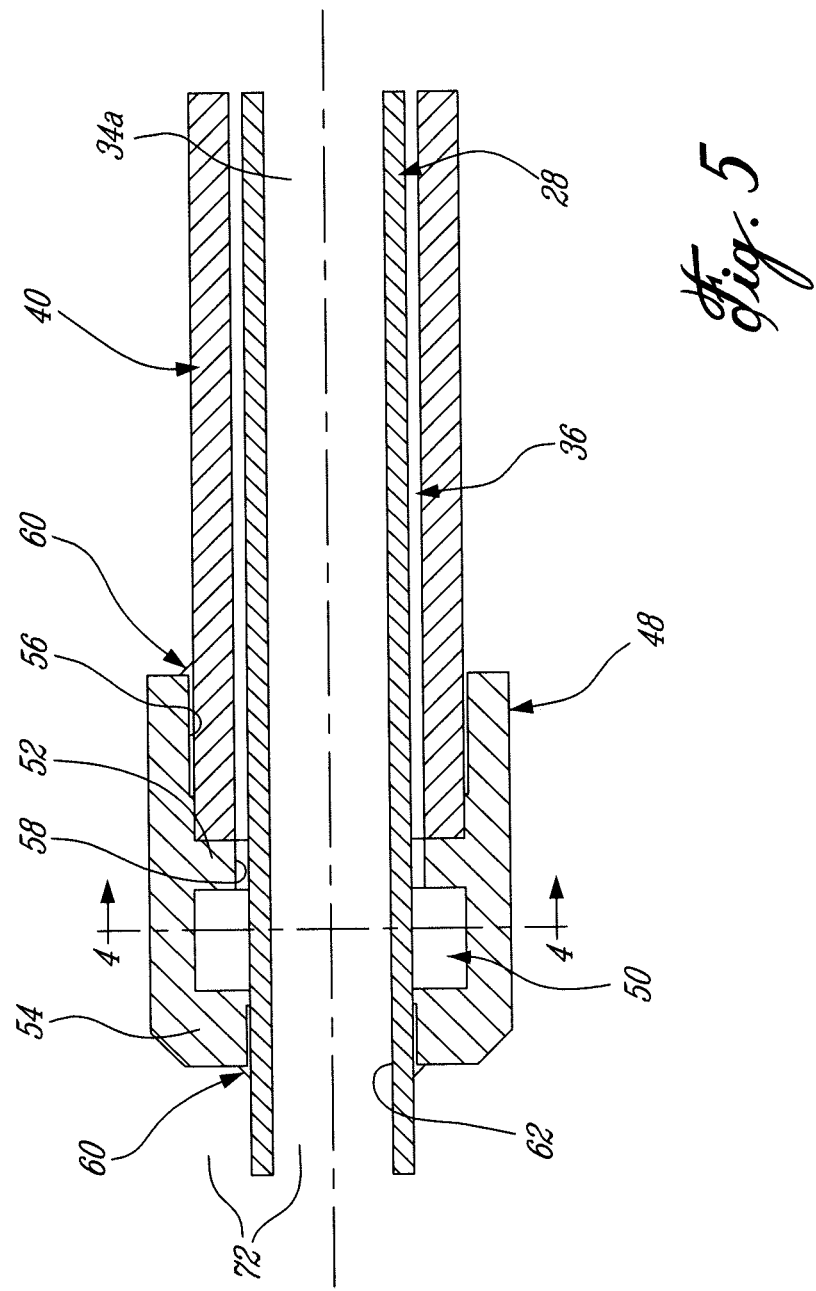
FIG. 5 is a schematic cross-sectional view of the fitting of FIG. 4, taken along line 5-5 in FIG. 4.

In a particular embodiment and referring to FIGS. 4 and 5, the inlet and outlet of the fuel conduits 36 are each provided by a respective end fitting 48 (only one of which is shown) which distributes fuel to or collects fuel from all the fuel conduits 36. Each fitting 48 encloses a fuel channel 50 partially defined by opposed inner and outer walls 52, 54. For each fuel conduit 36, the inner wall 52 includes a circular pocket 56 surrounding a circular hole 58 having an outer diameter corresponding to the inner diameter of the outer tube 40. The outer tube 40 is engaged in the pocket 56 and sealingly connected to the inner wall 52, for example through a brazed joint 60, while the inner tube 38 extends in the fitting 48 through the hole 58 in the inner wall 52, such as to form a fluid flow connection between the annular space between the tubes 38, 40 and the fuel channel 50. The outer wall 54 has a circular hole 62 through which the inner tube 38 sealingly extends, for example by connecting the inner tube 38 and the outer wall 54 through a brazed joint 60. A port with a connector 64 communicates with the fuel channel 50 and is designed to be complementary to end connectors of the fuel conduit (not shown) of the engine 10. This type of end fitting may facilitate visual and x-ray inspection of the joints.

Referring back to FIG. 2, in the embodiment shown, the heat exchanger 22 includes an air conduit 34a defined within the inner tube 38 of each fuel conduit 36, and a larger air conduit 34b defined by the free space in the annular duct 30 around the outer tubes 40 of the fuel conduits 36. The duct 30 is formed by one or more walls 66 of light weight sheet metal or other adequate light material, connected to form a closed cross-section such as to define the larger air conduit 34b. Since the heat exchanger 22 is located within the high pressure plenum 20, the pressure differential between the air conduit 34b and its surrounding environment is very small; as such, the duct 30 is not required to be made of high pressure casing material, and the thickness and weight of the wall(s) 66 can be minimized. In a particular embodiment the thickness of the wall(s) 66 is between 0.015 and 0.020 inches; it however understood that it could be larger or smaller depending on the size of the engine or the dynamic and stress requirements. In a particular embodiment the thickness of the wall(s) is less than 0.100 inch.

Figure 6:
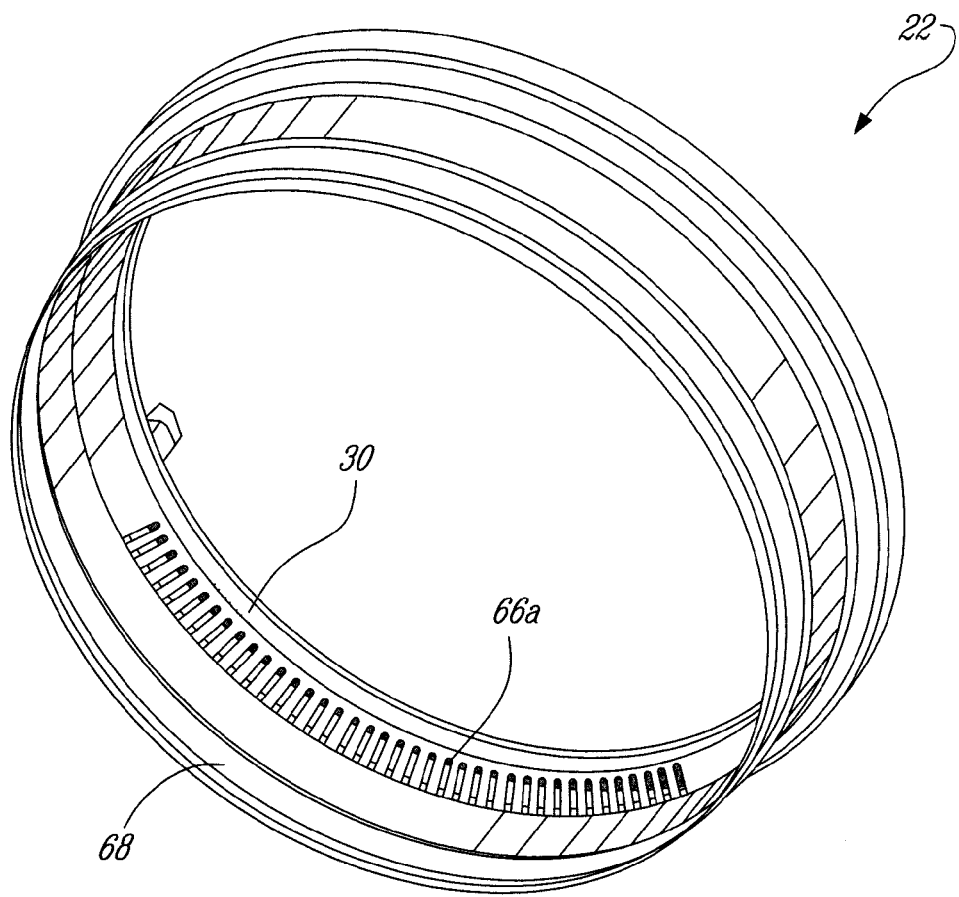
FIG. 6 is a tridimensional view of part of the heat exchanger of FIG. 2.

Referring to FIGS. 2 and 6, the heat exchanger 22 further includes an annular wall element 68 extending from the duct 30 along an approximately axial direction. The wall element 68 and an adjacent portion 66a of the wall(s) 66 of the duct 30 define a cross-sectional shape which is complementary to that of the annular baffle 32, such as to together form a closed cross-section. The wall element 68, the adjacent portion 66a of the duct wall and the baffle 32 together define a cooling plenum 70 which surrounds an annular cavity 90 around the turbine support case 92, and is in fluid flow communication therewith through the baffle 32.

Figure 7:
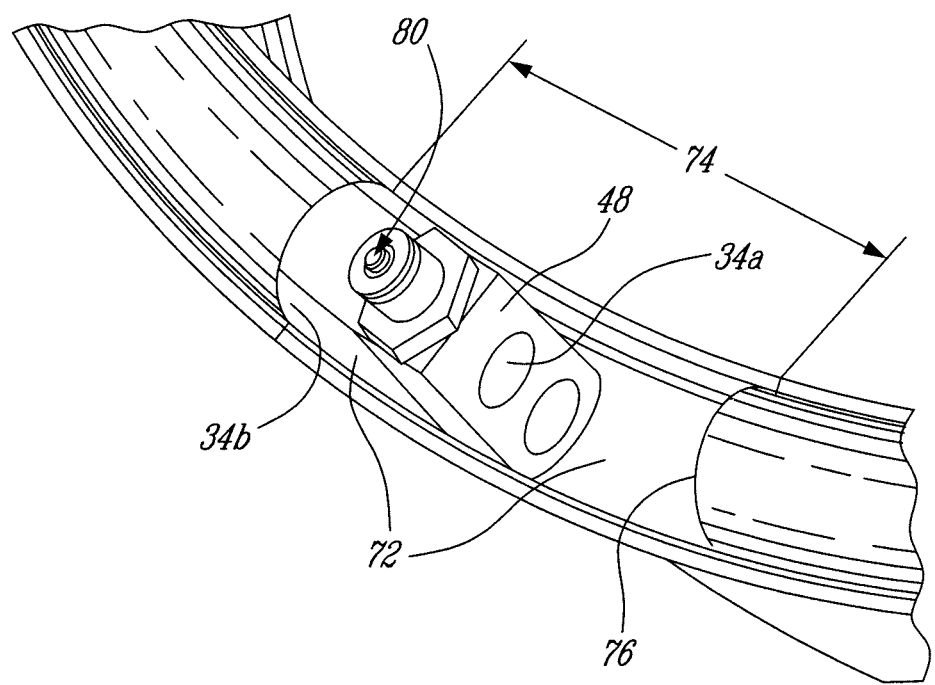
FIG. 7 is a partial tridimensional view of the heat exchanger of FIG. 2, showing an air inlet thereof.

The air conduits 34a,b define a fluid flow communication between the high pressure plenum 20 and the cooling plenum 70. In a particular embodiment and referring to FIGS. 5 and 7, the inlet 72 of the air conduits 34a,b is defined by an open section 74 in the duct 30 which is located in the high pressure plenum 20 and as such in direct fluid flow communication therewith. The end fitting 48 defining the outlet 80 of the fuel conduits 36 is preferably received in the open section 74, such as to define a counter flow heat exchanger, to reduce thermally induced stresses and maximize the heat transfer. However, the end fitting 48 defining the inlet 78 of the fuel conduits 36 (FIG. 8) can alternately be received in the open section 74. The air is free to flow in the inner tube 38 defining the fuel conduits 36, which is left open by the end fitting 48, and is also free to flow around the outer tubes 40 defining the fuel conduits 36 into the duct 30. A radial wall 76 closes the end of the open section 74 opposed that through which the fuel conduits 36 extend, so that the air is directed to flow along the fuel conduits 36 around the circumference of the duct 30.

Figure 8:
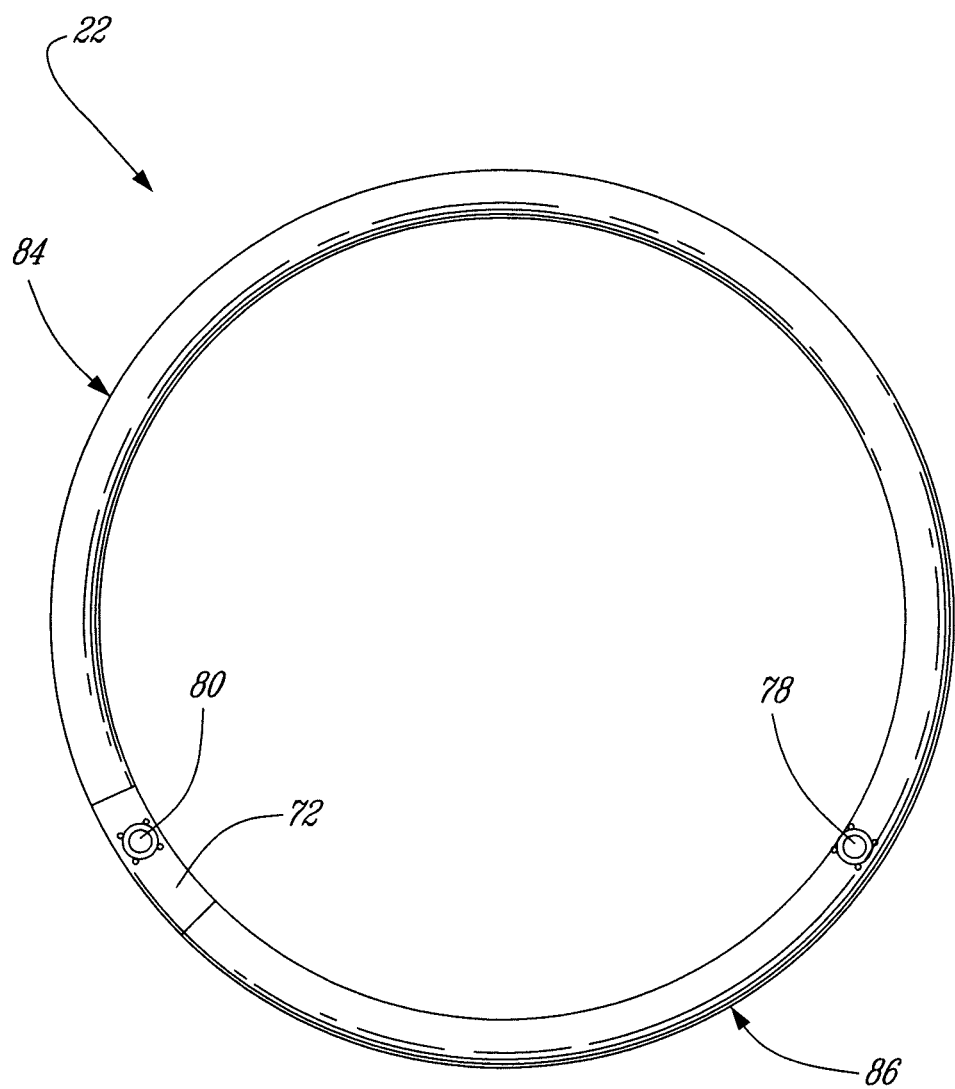
FIG. 8 is a front plan view of the heat exchanger of FIG. 2.
Figure 9:
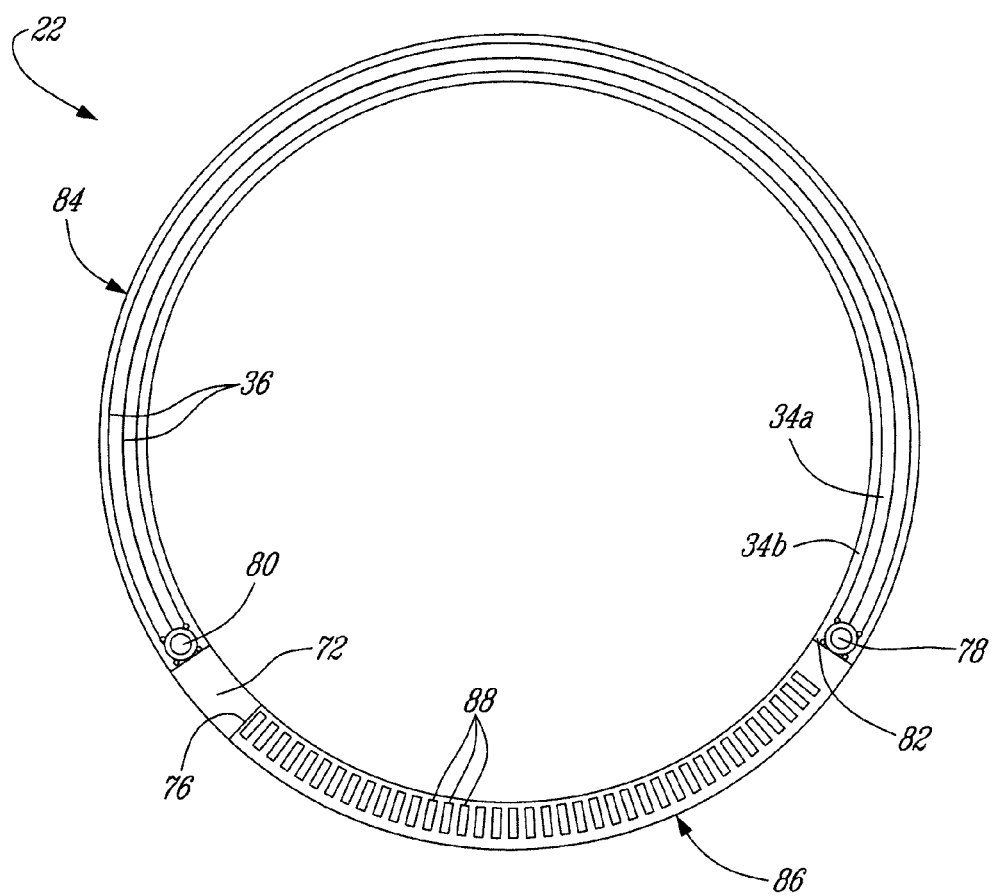
FIG. 9 is a front cross-sectional view of the heat exchanger of FIG. 2.

As can be seen in FIGS. 8-9, in the embodiment shown, the fuel conduits 36 extend around only part of the circumference of the duct 30. As such, the duct 30 has a first arcuate portion 84 containing the fuel conduits 36 and a second arcuate portion 86 without any fuel conduits extending therethrough, the two arcuate portions 84, 86 being separated by the radial wall 76 and by the fitting 48 defining the fuel inlet 78. In a particular embodiment, the first arcuate portion 84 extends around between approximately 240° and 315°. The second arcuate portion 86 is in direct fluid flow communication with the outlet 82 of the air conduits 34a,b. The portion 66a of the duct wall 66 located in the cooling plenum 70 and defining part of the second arcuate portion 86 includes a series of perforations 88 defined therethrough, shown here as elongated slots, to provide for the fluid flow communication between the outlets 82 of the air conduits 34a,b and the cooling plenum 70. The second arcuate portion 86 thus collects the cooled air and distributes it to the cooling plenum 70. The cooling plenum 70 draws the compressed air through the heat exchanger 22 from the high pressure plenum 20, and allows it to circulate around and through the perforated baffle 32 and to the annular cavity 90 (see FIG. 2) defined between the baffle 32 and the turbine support case 92. The perforated baffle 32 creates a pressure differential between plenum 70 and annular cavity 90. This pressure differential allows the cooled air to gain speed through the perforations of the baffle 32 to impingement cool the turbine support case 92, which carries the shroud segments 28. The turbine support case 92 is thus cooled by impingement from the air in plenum 70, passing through the perforations in the baffle 32.

The configuration of the heat exchanger 22 and its location in the high pressure casing 20 can allow for reduced weight in comparison with a heat exchanger necessitating a high pressure casing construction. Its location around the turbine support case may also allow for a reduction in fire hazard: a fuel leak would follow the air flow and as such cause a fire around the support case, which would lead to an increase of temperature which can be easily detected and lead to shut down of the engine. Fuel leaks and fire around the turbine disks may thus be avoided.

The above description is meant to be exemplary only, and one skilled in the art will recognize that changes may be made to the embodiments described without departing from the scope of the invention disclosed. For example, the fuel conduits 36 can extend around the complete perimeter of the annular duct 30 with the fuel inlet and outlet 78, 80 adjacent one another, and with the air inlet 72 and air outlet 82 remaining separately and independently defined. Other modifications which fall within the scope of the present invention will be apparent to those skilled in the art, in light of a review of this disclosure, and such modifications are intended to fall within the appended claims.

The invention claimed is:

1. A gas turbine engine comprising:
a compressor section;
an annular high pressure plenum in fluid flow communication with a discharge of the compressor section for receiving compressed air;
a combustor contained in the high pressure plenum;
a turbine section in fluid flow communication with the combustor; and
a heat exchanger located in the high pressure plenum outside of the combustor, the heat exchanger including at least one air conduit and at least one fuel conduit in heat exchange relationship with one another, with a fuel flow communication between a fuel source and fuel distribution members of the combustor being provided at least partly through the at least one fuel conduit, and the at least one air conduit defining a fluid flow communication between the high pressure plenum and an engine component to be cooled by the compressed air downstream of the heat exchanger.

2. The engine as defined in claim 1, wherein the heat exchanger includes an annular cooling plenum surrounding the engine component to be cooled and being in heat exchange relationship therewith, the cooling plenum being in fluid flow communication with the high pressure plenum through the at least one air conduit.

3. The engine as defined in claim 2, wherein the engine component to be cooled is a turbine support case of the turbine section which is surrounded by an annular cavity, the annular cooling plenum surrounding the annular cavity.

4. The engine as defined in claim 3, wherein the annular cavity surrounding the turbine support case is enclosed by an annular baffle, the cooling plenum being partially defined by the annular baffle, the baffle including perforations in the at least part thereof partially defining the cooling plenum, the perforations providing fluid flow communication between the cooling plenum and the annular cavity for impingement cooling on the turbine support case.

5. The engine as defined in claim 1, wherein the heat exchanger includes an annular duct surrounding the engine component to be cooled, each fuel conduit extending along an arc of circle within the annular duct.

6. The engine as defined in claim 5, wherein the at least one air conduit includes a space within the annular duct defined around the at least one fuel conduit.

7. The engine as defined in claim 6, wherein the annular duct is formed by sheet metal having a thickness of less than 0.100 inch.

8. The engine as defined in claim 5, wherein the heat exchanger includes an annular cooling plenum surrounding the engine component to be cooled and being in heat exchange relationship therewith, and wherein the annular duct includes an arcuate portion containing each fuel conduit and air conduit, and a remaining arcuate portion free of the at least one fuel conduit, the remaining arcuate portion being in fluid flow communication with an outlet of the at least one air conduit and with the cooling plenum.

9. The engine as defined in claim 1, wherein each fuel conduit has an annular cross section defined between two concentric tubes having different diameters, and the at least one air conduit includes a conduit defined inside an inner one of the two concentric tubes.

10. A method of cooling an engine component of a gas turbine engine, the method comprising:
circulating compressed air from a high pressure plenum in connection with a compressor discharge of the engine to a heat exchanger located in the high pressure plenum outside of a combustor contained in the high pressure plenum and upstream of the engine component to be cooled;
circulating fuel from a fuel source of the engine to the heat exchanger;
cooling the circulated compressed air in the heat exchanger through heat exchange with the fuel;
circulating the fuel from the heat exchanger to fuel distribution members of the combustor; and
cooling the engine component with the cooled compressed air from the heat exchanger.

11. The method as defined in claim 10, wherein the engine component is a turbine support case, and cooling the engine component with the cooled compressed air from the heat exchanger includes directing the cooled compressed air on the turbine support case.

12. The method as defined in claim 11, wherein directing the cooled compressed air on the turbine support case is performed to provide impingement cooling.

13. The method as defined in claim 10, wherein the heat exchanger is annular, and cooling the circulated compressed air in the heat exchanger through heat exchange with the fuel is performed by circulating both the air and the fuel around the engine component.

14. The method as defined in claim 13, wherein cooling the engine component with the cooled compressed air from the heat exchanger includes directing the cooled compressed air in an annular cooling plenum surrounding the engine component.

15. The method as defined in claim 14, further comprising circulating the cooled compressed air through an annular perforated baffle surrounding the engine component and also partially defining the cooling plenum.

16. A fuel air heat exchanger for a gas turbine engine disposed in a high pressure plenum outside of a combustor of the gas turbine engine, wherein the combustor is contained in the high pressure plenum, the heat exchanger comprising:
an annular duct having at least one fuel conduit and at least one air conduit extending around a circumferential direction thereof and in heat exchange relationship with one another, each fuel conduit having an inlet for communication with a fuel source and an outlet for communication with fuel distribution members of the combustor, each air conduit having an inlet and an outlet;
an annular wall element extending from the duct along an approximately axial direction; and
a perforated baffle extending from the duct along an approximately axial direction and connected to the wall element spaced apart from the duct, the wall element, baffle and an adjacent portion of at least one wall of the duct together forming a closed cross-section and defining an annular cooling plenum in fluid flow communication with the outlet of each air conduit.

17. The heat exchanger as defined in claim 16, wherein the annular duct has a first arcuate portion containing the at least one fuel conduit and the at least one air conduit, and a second arcuate portion defining a remainder of the annular duct and being free of the at least one fuel conduit, the second arcuate portion being in direct fluid flow communication with the outlet of each air conduit, and in fluid flow communication with the inlet of each air conduit only through the air conduit, and the duct defining a fluid flow communication between the second arcuate portion and the cooling plenum.

18. The heat exchanger as defined in claim 16, wherein the at least one air conduit includes a space within the annular duct defined around the at least one fuel conduit.

19. The heat exchanger as defined in claim 18, wherein the at least one wall of the duct has a thickness of less than 0.100 inch.

20. The heat exchanger as defined in claim 16, wherein each fuel conduit has an annular cross section defined between two concentric tubes, and the at least one air conduit includes a conduit defined inside a smallest one of the two concentric tubes.

* * * * *